SECTION A.A.

SECTION B.B.

United States Patent Office 3,523,338
Patented Aug. 11, 1970

3,523,338
GRIPPING DEVICE FOR ROPES
Peter Arthur Aldred and Geoffrey Farthing, Harrogate, England, assignors to Imperial Chemical Industries Limited, London, England, a corporation of Great Britain
Filed Oct. 30, 1967, Ser. No. 678,916
Int. Cl. F16g *11/05, 11/04*
U.S. Cl. 24—122.6          6 Claims

ABSTRACT OF THE DISCLOSURE

A gripping device for rope, especially rope having a parallel filamentary core, is provided which comprises a tubular housing having an internally tapered portion, a double tapered member which fits inside the housing so that one tapered portion is complementary to the tapered portion of the housing and the other tapered portion is complementary to the interface of a collar which fits inside the housing and over the other tapered portion of the double tapered member. In use the end of the core of a sheet rope is distributed about the periphery of the double tapered member so as to pass between the collar and the double tapered member, and then over the collar and back between the double tapered member and the tapered portion of the housing.

---

This invention relates to a gripping device for ropes, in particular for ropes having a parallel filamentary core.

Ropes having a parallel filamentary bundle as the core of the structure encased in a plastics or rubber sheath are known from U.K. patent specification 933,755. Such ropes have an inherently higher strength than those of the same size but of a twisted construction. However, parallel filamentary core ropes are difficult to grip or join successfully so as to fully utilise this inherent strength advantage.

According to the present invention we provide a gripping device for ropes, especially ropes having a parallel filamentary core, comprising a double tapered member, a collar and a housing.

The double tapered member preferably has the form of a double cone with the bases together as such a shape may be readily formed by machining or preferably by moulding. The housing is shaped to accommodate at least the lower portion of the double tapered member with an appropriate clearance as hereinafter described. It may be cast or machined in one part or it may be composed of several fitted parts which may include encasement of the upper tapered portion of the double tapered member and a fitting by means of which the unit and its attached rope is anchored. The collar is arranged to fit over the upper tapered portion of the double tapered member and is of such dimensions as to accommodate the opened-out filamentary core between it and the upper tapered portion of the double tapered member.

Figure 1:
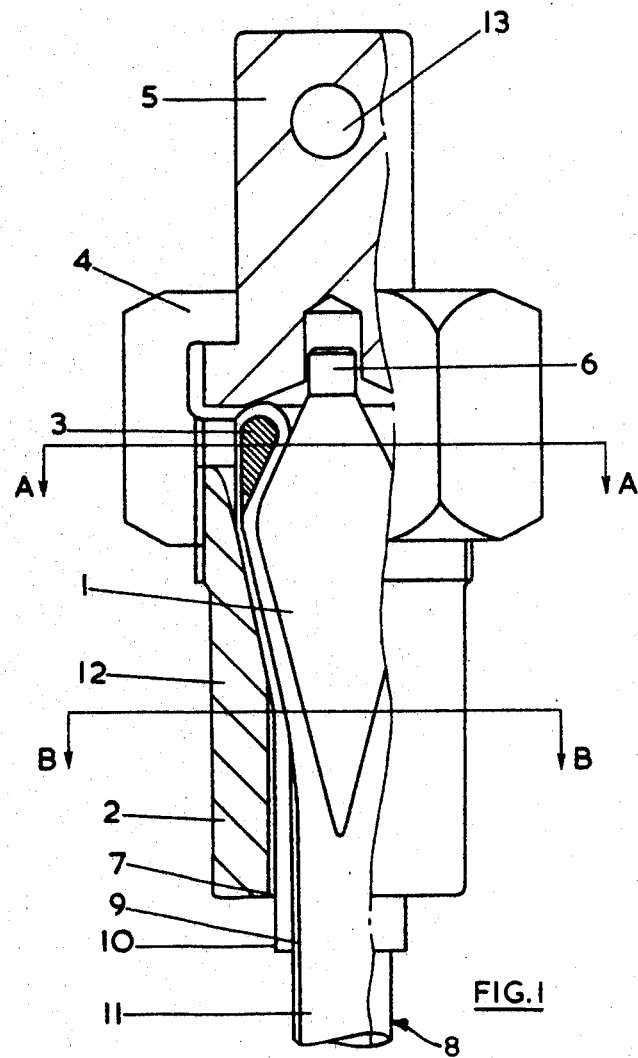
Figure 2:
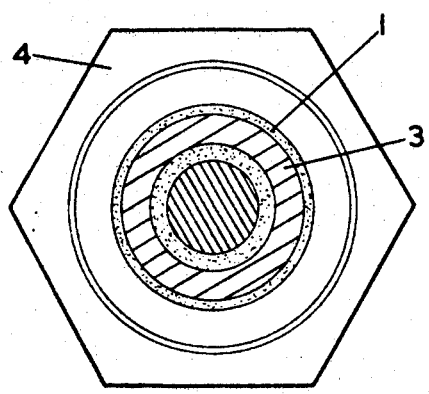
Figure 3:
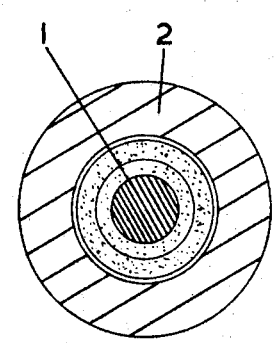

The accompanying drawings illustrate an embodiment of our invention, in which FIG. 1 is a side view of the device partly sectioned. FIGS. 2 and 3 are cross sections of the device shown in FIG. 1 on the planes A—A and B—B respectively.

In FIG. 1 part of an opened-out filamentary core, which would obscure the view of a double tapered member within, is not shown.

In FIG. 1 a gripping device is shown comprising a double tapered member 1 having a double circular cone form with the bases together, a lower housing 2, a collar 3, an upper housing 4 and an anchoring piece 5. The lower cone of member 1 is of smaller apex angle (and is therefore longer) than the upper cone which has a cylindrical projection 6 at its apex. The lower housing 2 is of cylindrical form, having a lower cylindrical bore section 7 of diameter sufficient to accommodate a rope 8 including its sheath 9 and the opened-out ends 10 of the filamentary rope core 11, and an upper tapered bore section 12, the taper thereof being matched with that of the lower cone of member 1 as hereinafter described. The collar 3 is of tapered internal bore to suit the taper of the upper cone of member 1 and to allow a space between for passage of the opened out filamentary rope core. The outer surface of collar 3 is preferably cylindrical and the top of the collar is smoothly rounded. The upper housing 4 is internally screwed and fits on the upper part of lower housing 2. Upper housing 4 is conveniently of a form similar to a pipe union, wherein the anchor piece 5, flanged at its lower end, is clamped to the housing by an internal flange at the upper end of 4. tachment of an anchoring bolt and is recessed at its lower end to accommodate the projection 6 on the upper cone of member 1 and so effect centering of member 1 within its housing when the parts are screwed together.

In use the lower housing 2 is placed over the end of the rope 8 and a length of the sheath 9, equal to approximately twice the length of the lower housing 2, is removed. The apex of the lower cone portion of member 1 is then inserted into the center of the filamentary core and pushed down into it to a depth about twice its length, at the same time the filaments of the care are manually distributed about member 1 as evenly as possible. At this point the filaments are brought together and passed through the collar 3 which is pushed down until impeded by contact with the upper cone portion of member 1. The filaments are then folded outwardly over the collar and passed downwardly around the member 1. Housing 2 is then brought up into contact with the filaments surrounding member 1 and anchor piece 5 and housing 4 are connected thereto, the whole unit then being tightened up. Finally protruding filaments at the lower end of the unit are cut off close to the housing 2 if necessary. Preferably the whole unit is made proof against water absorption by suitable means as for example taping with waterproof tape or coating with bitumen. Failure to properly proof the unit, especially in submarine applications may lead to absorption of water by capillary action over considerable lengths of rope with consequent alteration of rope properties, as for example its density.

It will be appreciated from the foregoing description that the main gripping action of a device according to this invention is provided by the wedging action on the doubled layer of filaments between the lower cone surface of member 1 and the tapered bore of lower housing 2 coupled with the locking action provided by doubling the filaments around the collar 3 and drawing them down onto the upper conical surface of member 1. It is preferred to use a taper of 10°–15° for the bore of lower housing 2 as this provides the required wedging action provided that the cone angle of the lower cone portion of member 1 is selected so as to provide a constant annular area between the tapered housing bore and the lower cone surface, which area is equal to twice the area of the filamentary rope core. The cone angle of the upper conical portion of member 1 is not as critical as the lower cone angle. In general a larger angle is preferred for the upper cone said angle being as large as practicable in order that the radius of the top of the collar is also as large as practicable to reduce any tendency to cut or damage the filaments passed therearound by not sharply bending them. Selection of the dimensions of the parts in this way provides a very effective clamping device but small departures from the ideal dimensions are not deleterious.

Each unit is most effective for a particular rope size i.e. core and overall diameters. Known engineering principles are used in calculating the dimensions of the various parts of a clamping device but for guidance we provide the following relationships, expressed in terms of the overall rope diameter, D, which are typical of effective units.

Lower housing:
- (a) Cylindrical bore _____ 1.3D
- (b) Uppermost taper bore _____ 2.2D
- (c) Length of taper _____ 2.4D Double cone member:
- (a) Maximum diameter _____ 1.5D
- (b) Overall length _____ 5.0D Collar:
- (a) Outer diameter _____ 1.8D
- (b) Minimum inside diameter _____ 1.1D
- (c) Depth _____ 0.75D Typical inclinations of the tapered parts of an efficient clamping device are as follows. These angles represent the inclination from a vertical line as depicted in FIG. 1.

|  | Degrees |
|---|---|
| (a) Tapered bore of housing | 10 |
| (b) Upper cone of double cone member | 28 |
| (c) Lower cone of double cone member | 14 |
| (d) Tapered bore of collar | 24 |

In the foregoing embodiment the housing for the double tapered member and the collar is made in three parts. Other forms of a device according to this invention will be evident, as for example, a simplified form wherein the housing and anchor piece are made in a single cast unit, as shown in FIGS. 4 and 5, the upper end being open for passage of the rope, double cone member etc. and anchoring being by means of two lugs cast or welded onto the upper edge of the housing 14. In this case centering of the double cone and sealing of the upper end of the unit may be achieved by means of a disc with a central hole which fits the end of the housing, is secured thereto by means of a plate 15 which is screwed to the upper edge of the housing and sealed by a rubber sealing ring placed between the disc and the plate. To provide initial gripping of the rope resilient means may be provided between the collar and the anchoring piece or centering disc, as for example a spring or a rubber washer, which presses the filaments and collar onto the double cone member and against the tapered bore of the housing.

For simplifying disassembly of a unit the projection 6 may be drilled and tapped to provide a means for attaching an extraction tool as in use the double cone member becomes very tightly wedged in the housing.

Clamping devices according to the invention may be made of any materials which may be formed by machining or casting and which have adequate strength. We have found that nylon is a very suitable material for the double cone member as it is readily available in bar or rod form which is easily machined or it may be readily moulded directly into the final form. In moulding large units it may be necessary to cast the unit in more than one piece and to stick the parts together subsequently, in order that the effect of shrinkage on cooling from the casting temperature may be overcome.

In the foregoing description the tapered parts have had a simple, straight taper as this is most easily produced by machining processes. However, instead of this simple form of taper a curved form may be used, especially if the parts having the taper are produced by moulding, when various taper forms are readily produced. Thus for example, the lower cone section of the double tapered member may have a convex surface while other tapered parts have straight tapers or adjacent parts may be both of curved taper form or any combination of straight and curved tapers may be used.

Clamping devices according to this invention are particularly adapted for terminating or joining ropes of the sheathed parallel filamentary core type but the devices may also be used for laid ropes if such ropes are first carefully untwisted.

What we claim is:
1. A gripping device for laid or sheathed ropes comprising a tubular housing, portion of which is internally tapered, a double tapered member fitting inside the housing, one tapered portion of which is complementary to the tapered portion of the housing and the other tapered portion of which is complementary to the inner face of a collar which fits inside the housing over the said other tapered portion of the double tapered member, said collar, double tapered member and housing being dimensioned with respect to each other to leave a zone for passage of the end of rope between the tapered portion of the housing and complementary portion of the double tapered member, between the inner face of the collar and the other tapered portion of said double tapered member, around said collar so that the collar can be essentially encircled by said rope end and between said collar and said housing, wherein in use an end of a laid rope or an end of the core of a sheathed rope is distributed about the periphery of the double tapered member passing thereafter over the collar and back between the double tapered member and the tapered portion of the housing, the surface of the collar over which the rope is passed being rounded and said device including means adapted for attachment to said housing for centering said double-tapered member and for maintaining same within said housing, and means for anchoring said housing.

2. In combination, a device according to claim 1 and a rope comprised of a plurality of parallel filaments gripped thereby, the end of the tapered portion of said double tapered member which is complementary with the tapered portion of the housing being inserted into an end of the rope, filaments of said rope end being distributed about the periphery of said double tapered member and lengthwise thereof passing between said collar and the other tapered portion of said double tapered member, then over said collar and back between the double tapered member and the complementary tapered portion of the housing, said housing, collar and double tapered member being held tightly together to thereby grip said filaments.

3. A gripping device according to claim 1 wherein the double tapered member has the form of two right circular cones with bases together.

4. A gripping device according to claim 1 wherein the housing is made up of more than one part.

5. A gripping device according to claim 1 wherein the double tapered member is made of plastics material.

6. A gripping device according to claim 5 wherein the material is nylon.

References Cited

UNITED STATES PATENTS

| 1,408,144 | 2/1922 | Snow | 24—126 |
|---|---|---|---|
| 2,327,831 | 8/1943 | Sutton. | |
| 3,023,535 | 3/1962 | Holka. | |
| 3,085,306 | 4/1963 | Drysdale | 24—126 |
| 3,309,744 | 3/1967 | Sironi | 24—122.6 |

FOREIGN PATENTS

| 755,864 | 8/1956 | Great Britain. |
|---|---|---|
| 265,999 | 4/1964 | Australia. |
| 986,728 | 8/1951 | France. |

BERNARD A. GELAK, Primary Examiner

U.S. CL. X.R.

24—126; 287—82